United States Patent [19]

Morrison, Jr.

[11] 4,399,237

[45] Aug. 16, 1983

[54] VESICULATED POLYMER GRANULES CONTAINING TIO$_2$

[75] Inventor: William H. Morrison, Jr., Wilmington, Del.

[73] Assignee: E. I. Du Pont de Nemours & Co., Wilmington, Del.

[21] Appl. No.: 441,756

[22] Filed: Nov. 15, 1982

[51] Int. Cl.$^3$ .............................. C08J 9/26; C08J 9/28
[52] U.S. Cl. ........................................ 521/62; 521/56; 521/60; 521/64; 521/107; 521/138; 523/501; 523/504; 523/505

[58] Field of Search .................... 521/62, 64, 107, 138, 521/56

[56] References Cited

U.S. PATENT DOCUMENTS 3,923,704 12/1975 Geinning et al. .................... 521/138

Primary Examiner—Morton Foelak

[57] ABSTRACT

Vesiculated polymer granules having high refractive indices can be made from an aqueous slurry of particulate TiO$_2$ if the slurry contains a phosphate ester.

8 Claims, No Drawings

VESICULATED POLYMER GRANULES CONTAINING TiO₂

DESCRIPTION

Technical Field

This invention relates to a form of $TiO_2$ pigment. More particularly, it relates to $TiO_2$ pigment composed of polymer granules containing $TiO_2$ particles and micro-voids, to a method for preparing such granules, and to coating compositions containing them.

Background and Summary of the Invention $TiO_2$ has a high refractive index for its density, which makes it an outstanding pigment for coatings.

This high refractive index can be enhanced to an even higher level, and the hiding power of the $TiO_2$ correspondingly improved, if the $TiO_2$ particles are incorporated in polymer granules which contain micro-voids. Such granules are commonly called "vesiculated" granules and are described in U.S. Pat. No. 3,923,704 to Gunning and Lubbock.

Vesiculated granules are ordinarily prepared by the well-known method of first making a slurry of $TiO_2$ in water, using a hydrophobic surfactant as a dispersing aid. This slurry is then added, with vigorous agitation, to a solution of a polymer, ordinarily but not necessarily a polyester, in a liquid cross-linking agent such as styrene. This gives an emulsion of water in the polymer/cross-linking agent solution. In this step, the $TiO_2$ particles are flushed from the water phase to the polymer phase. This emulsion is then itself emulsified in water, and the polymer cross-linked, usually by heat, to give an aqueous slurry of vesiculated granules containing $TiO_2$ particles. For maximum enhancement of refractive index, the $TiO_2$ particles should be in the polymer matrix, and not in the voids or on the granule surfaces.

Some commercial $TiO_2$ slurries contain hydrophilic surfactants for stability. When these slurries are used to prepare vesiculated granules in the manner just described, a significant portion of the $TiO_2$ particles is ultimately found either in the voids or on the granule surfaces, and much of the refractive index enhancement otherwise possible is lost.

It has now been found that such $TiO_2$ slurries can be successfully used to prepare vesiculated granules if the slurries contain a phosphate ester represented by the structure

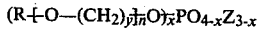 (I)

where
R is an aliphatic hydrocarbon radical of 4–16 carbon atoms, an octylphenol radical or a nonylphenol radical,
n is 4–12,
x is 1 or 2,
y is 2 or 3 and
z is H, Na or K.

When these phosphate esters are used, most of the $TiO_2$ particles in the resulting vesiculated granules are in the cross-linked polymer matrices, not in the voids or on the granule surfaces. These granules will have diameters of 1–50 microns (as measured optically against a calibrated standard), and will contain 1–60%, by weight of the granules, of $TiO_2$ particles (as determined by ashing); 5–95%, by volume of the granules, of voids (as determined by densitometry); and 0.5–4.0%, by weight of the $TiO_2$, preferably 1.8–2.2%, of a phosphate ester of structure (I). (The identity of the ester, and the amount present, is determined by quantitative extraction of the granules with acetone, removal of acetone from the extract, separation of the esters from the other extractables by high pressure liquid chromatography, and identification of the ester by infrared spectroscopy.)

DETAILED DESCRIPTION OF THE INVENTION

The vesiculated polymer granules of the invention are prepared from an aqueous slurry of $TiO_2$ which contains a hydrophilic surfactant stabilizer such as, for example, a polycarboxylic acid. Such a slurry may also contain amines for pH control and defoaming agents. The $TiO_2$ in the slurry can be any of the rutile variety, prepared by either the chloride process or the sulfate process.

To this slurry is added 0.5–4.0%, preferably 1.8–2.2%, by weight of the $TiO_2$, of a phosphate ester of structure (I). Mixtures of esters can also be used. A product preferred for this use is "Monofax 831", sold by Mona Industries of Paterson, N.J. This product is a 75/25 weight mixture of esters represented by the structure

and

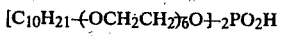

respectively. This mixture will be referred to hereinafter as Ester Mixture A.

Vesiculated polymer granules may then be prepared from this slurry, using the materials and procedures shown in the previously mentioned U.S. Pat. No. 3,923,704, which is incorporated into this application to describe polymers, cross-linking agents and adjuncts which may be used, as well as the manipulative steps and process conditions.

The polymer preferred for use is "Polycor 939-X-300", sold by Cook Paint and Varnish Co., Kansas City, Missouri, and believed to be a polyester conventionally prepared from fumaric acid, phthalic anhydride and propylene glycol in molar proportions of approximately 3:1:4.

The slurry of vesiculated granules of the invention which results when these procedures are followed can be used directly to prepare a coating composition by mixing it with a suitable film-forming component, using known techniques. Alternatively, the granules can be separated from the slurry by filtration or centrifugation and may then be used in any of the conventional ways.

EXAMPLE—Best Mode

In the following description, all parts are by weight. Two hundred parts of a slurry containing

| | |
|---|---|
| TiO₂ (rutile) | 152 parts |
| 2-amino-2-methyl propanol | 0.42 part |
| Water | 47.58 parts | were placed in a vessel.

To the slurry were then added, with stirring,

| | |
|---|---|
| Ethanol (absolute) | 0.93 part |
| Foammaster V (Defoaming Agent sold by Diamond Shamrock Co., Morristown, NJ) | 0.23 part |
| Ester Mixture A | 3.00 parts |

The slurry was stirred for five minutes and to it was then added, with stirring, a solution of

| | |
|---|---|
| Water | 36.12 parts |
| Diethylenetriamine | 3.00 parts |

The slurry was stirred for one minute and was then added to a vigorously stirred solution of

| | |
|---|---|
| "Polycor 939-X-300" | 140.0 parts |
| Styrene | 50.0 parts |
| Azobisbutyronitrile | 1.90 parts |

The resulting emulsion was vigorously stirred for 2 minutes, slowly stirred for 15 minutes more, and then added to a vigorously stirred solution, at 90°–95° C. of

| | |
|---|---|
| Water | 800.0 parts |
| Partially hydrolyzed polyvinyl acetate | 12.0 parts |
| Hydroxyethylcellulose | 6.4 parts |

Stirring of the mixture was then reduced to low, heating was stopped, and then stirring continued for 10 minutes.

The mixture was then cooled to ambient temperature, to give a slurry of vesiculated polymer granules, substantially all of whose TiO$_2$ particles were in the polymer matrix.

I claim:

1. A vesiculated pigment granule having a diameter of 1–50 microns, the granule comprising
   (a) 1–60%, by weight, of TiO$_2$ particles in a matrix of an unsaturated polyester resin cross-linked with a polymerizable unsaturated monomer,
   (b) 5–95%, by volume, of voids, and
   (c) 0.5–4.0%, by weight of the TiO$_2$, of a phosphate ester represented by the structure

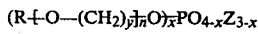
   $(R{+}O{-}(CH_2)_y]_n O)_x PO_{4-x} Z_{3-x}$ where
   R is an aliphatic hydrocarbon radical of 4–16 carbon atoms, an octylphenol radical or a nonylphenyl radical,
   n is 4–12,
   x is 1 or 2,
   y is 2 or 3, and
   z is H, Na or K.

2. The granule of claim 1 in which the phosphate ester is a 75/25 weight mixture of esters represented by the structure

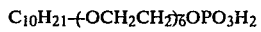
   $C_{10}H_{21}{+}OCH_2CH_2)_{\overline{6}}OPO_3H_2$ and

   $[C_{10}H_{21}{+}OCH_2CH_2{+}_6 O]_2 PO_2 H.$

3. An aqueous slurry of granules according to claim 1.

4. An aqueous slurry of granules according to claim 2.

5. A coating composition comprising granules according to claim 1, a film-forming component and a liquid carrier.

6. A coating composition comprising granules according to claim 2, a film-forming component and a liquid carrier.

7. A method for preparing granules according to claim 1, the method comprising
   (a) adding 0.5–4.0% of a phosphate ester represented by the structure

   $(R{+}O{-}(CH_2)_y]_n O)_x PO_{4-x} Z_{3-x}$ where
   R is an aliphatic hydrocarbon radical of 4–16 carbon atoms, an octylphenyl radical or a nonylphenol radical,
   n is 4–12,
   x is 1 or 2,
   y is 2 or 3, and
   z is H, Na or K, to an aqueous slurry of TiO$_2$ particles which contains a hydrophilic surfactant stabilizer,
   (b) forming a water-in-solution emulsion of the slurry in a solution of an unsaturated polyester resin in a liquid polymerizable unsaturated monomer cross-linking agent, and
   (c) emulsifying the emulsion in (b) in water to form a slurry of the granules in water.

8. The method of claim 7 having the additional step of separating the granules from the slurry.

* * * * *

UNITED STATES PATENT OFFICE
CERTIFICATE OF CORRECTION

PATENT NO. : 4,399,237
DATED : August 16, 1983
INVENTOR(S) : William Harvey Morrison, Jr.

It is certified that error appears in the above-identified patent and that said Letters Patent are hereby corrected as shown below:

Claim 2, last line, delete the period and add --, respectively.--

Signed and Sealed this

Twenty-second Day of November 1983

[SEAL]

Attest:

GERALD J. MOSSINGHOFF

Attesting Officer    Commissioner of Patents and Trademarks